US010452546B2

(12) United States Patent
Mesnier et al.

(10) Patent No.: US 10,452,546 B2
(45) Date of Patent: Oct. 22, 2019

(54) CACHE UTILITY MODELING FOR AUTOMATED CACHE CONFIGURATION

(71) Applicant: Intel Corporation, Santa Clara, CA (US)

(72) Inventors: Michael Mesnier, Scappoose, OR (US); Arun Raghunath, Portland, OR (US); Mariusz Barczak, Gdansk (PL); John Keys, Beaverton, OR (US)

(73) Assignee: Intel Corporation, Santa Cllara, CA (US)

( * ) Notice: Subject to any disclaimer, the term of this patent is extended or adjusted under 35 U.S.C. 154(b) by 0 days.

(21) Appl. No.: 15/851,567

(22) Filed: Dec. 21, 2017

(65) Prior Publication Data

US 2019/0034339 A1    Jan. 31, 2019

(51) Int. Cl.
*G06F 12/00* (2006.01)
*G06F 12/0815* (2016.01)
*G06F 13/16* (2006.01)
*G06F 12/0893* (2016.01)
*G06F 12/0802* (2016.01)

(52) U.S. Cl.
CPC ...... *G06F 12/0815* (2013.01); *G06F 12/0802* (2013.01); *G06F 12/0893* (2013.01); *G06F 13/16* (2013.01); *G06F 2212/2515* (2013.01); *G06F 2212/601* (2013.01); *G06F 2212/604* (2013.01); *G06F 2212/608* (2013.01)

(58) Field of Classification Search
CPC ............. G06F 12/0815; G06F 12/0802; G06F 12/0893; G06F 13/16; G06F 2212/2515; G06F 2212/601; G06F 2212/604; G06F 2212/608
See application file for complete search history.

(56) References Cited

U.S. PATENT DOCUMENTS

2013/0185475 A1*  7/2013  Talagala .............. G06F 12/0866
                                                         711/102

* cited by examiner

*Primary Examiner* — Shawn X Gu
(74) *Attorney, Agent, or Firm* — Compass IP Law, PC (57) ABSTRACT

Examples may include techniques to monitor processing of I/O requests of an application being executed by a computing platform by collecting a trace of the I/O requests, the trace including an I/O class of each I/O request; replay the trace and automatically analyze possible cache configuration policies for using a cache during execution of the application by the computing platform; and determine an optimal cache configuration policy for the cache from the possible cache configuration policies. The optimal cache configuration policy may then be applied to use of the cache during subsequent execution of the application by the computing platform.

21 Claims, 9 Drawing Sheets

CACHE UTILITY MODELING FOR AUTOMATED CACHE CONFIGURATION

TECHNICAL FIELD

Examples described herein are generally related to automatically configuring a disk cache used in a storage system.

BACKGROUND

In current data centers, the performance and throughput of multicore, multi-processor servers are being held back by storage input/output (I/O) tasks that cannot keep up with the ever-increasing demand for access to more data, preventing such servers from reaching their full performance potential. Traditional solutions, such as increasing storage, adding more servers, and adding more memory also add huge expense as well as management complexity to the data center.

A software or a hardware cache may be a type of structure for improving performance of applications or processing logic which frequently calculate and fetch data in a network or data center environment. Software caches may involve caching of data in a software structure that may be beneficial when calculating and fetching data is expensive in terms of increased latency and overhead. Caching at least some data locally in a server or in a middle tier of the data center, such as a solid-state drive (SSD), may improve a speed of a subsequent fetch of the same data or content.

DETAILED DESCRIPTION

As contemplated in the present disclosure, a cache, whether implemented in software or hardware, may be a type of structure for improving the performance of applications which frequently calculate and fetch data.

In embodiments of the present invention, cache acceleration logic may be combined with high performance SSDs in a computing system to increase application performance via intelligent caching. Cache acceleration logic allows system administrators to target high performance of servers directly to the applications and data that add the most value to the efficient functioning of the data center. Cache acceleration logic may interoperate with server memory and one or more SSDs to create a multilevel cache that optimizes the use of system memory and automatically determines the best cache level for active data according to a selected cache configuration policy, thereby allowing applications to perform even faster than running fully on flash memory and SSDs. In one embodiment, a portion of cache acceleration logic may be installed into the operating system, providing a cache configuration policy solution that is transparent to users and applications, and a portion may also be installed into back end storage in the data center. In embodiments, the cache acceleration logic may transparently accelerate applications, deliver application specific performance improvements, provide SSD-like performance without added migration costs, reduce storage latency, and increase virtual machine (VM) density.

Figure 1:
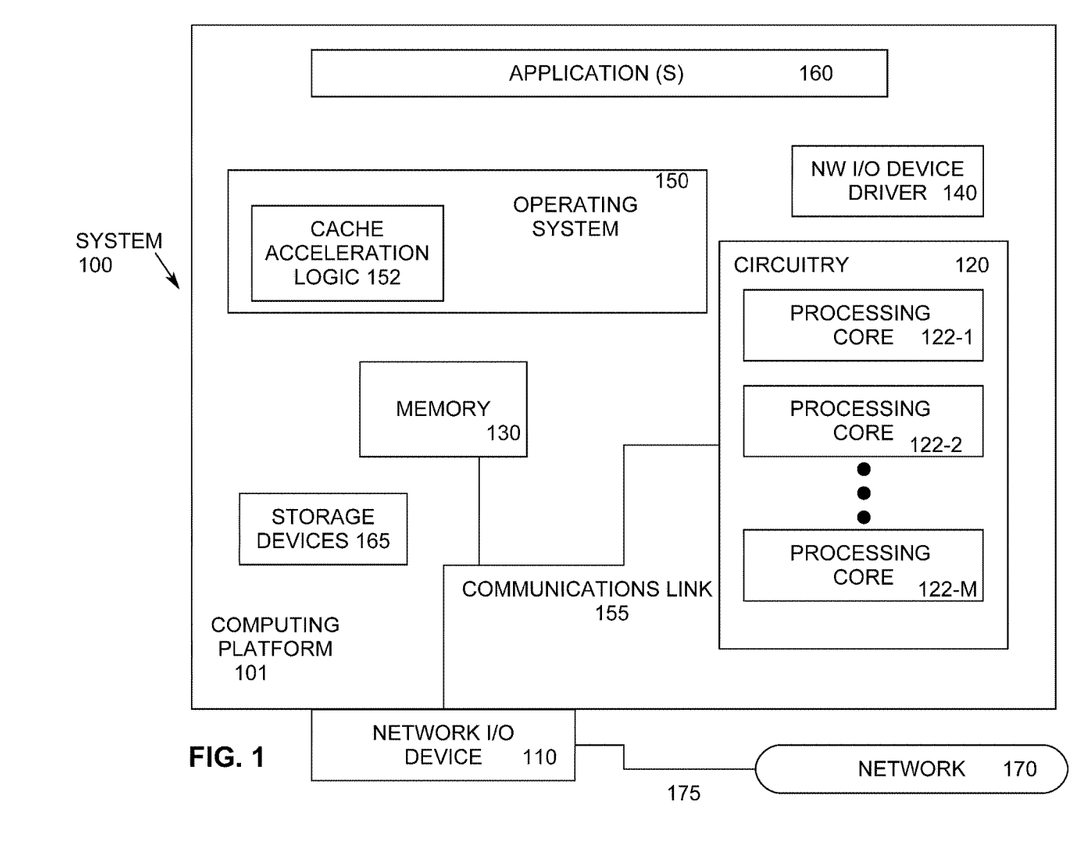
FIG. 1 illustrates an example first system.

FIG. 1 illustrates an example first system. As shown in FIG. 1, the example first system includes system 100. Also, as shown in FIG. 1, system 100 includes a computing platform 101 coupled to a network 170. In some examples, as shown in FIG. 1, computing platform 101 may couple to network 170 via a network communication channel 175 and through a network I/O device 110 (e.g., a network interface controller (NIC)) having one or more ports connected or coupled to network communication channel 175.

In some examples, computing platform 101 may be deployed as part of a group of network function virtualization (NFV) computing platforms. These NFV computing platforms may be deployed in service provider (e.g., communications service providers, cloud service providers, etc.) and/or data center networks and may be capable of hosting many different virtual network functions (VNFs) as well as many different application types running in or being executed by virtual machines (VMs) and/or containers to support VNFs (VMs and VNFs are not shown in FIG. 1).

According to some examples, computing platform 101, as shown in FIG. 1, may include circuitry 120, memory 130, a network (NW) I/O device driver 140, an operating system (OS) 150, one or more application(s) 160, and storage devices 165. In at least one embodiment, operating system 150 may include cache acceleration logic 152, and storage devices 165 may be one or more of hard disk drives (HDDs) and/or solid state drives (SSDs). In some examples, as shown in FIG. 1, circuitry 120 may communicatively couple to memory 130 and network I/O device 110 via communications link 155. Although not shown in FIG. 1, in some examples, operating system 150, NW I/O device driver 140 or application(s) 160 may be implemented, at least in part, via cooperation between one or more memory devices included in memory 130 (e.g., volatile or non-volatile memory devices) and elements of circuitry 120 such as processing cores 122-1 to 122-m, where "m" is any positive whole integer greater than 2. In some examples, application(s) 160 may be associated with one or more VNFs supported by VMs hosted by computing platform 101.

In some examples, computing platform 101, may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or a combination thereof. Also, circuitry 120 having processing cores 122-1 to 122-m may include various commercially available processors, including without limitation Intel® Atom®, Celeron®, Core (2) Duo®, Core i3, Core i5, Core i7, Itanium®, Pentium®, Xeon® or Xeon Phi® processors; and similar processors.

According to some examples, memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above.

Figure 2:
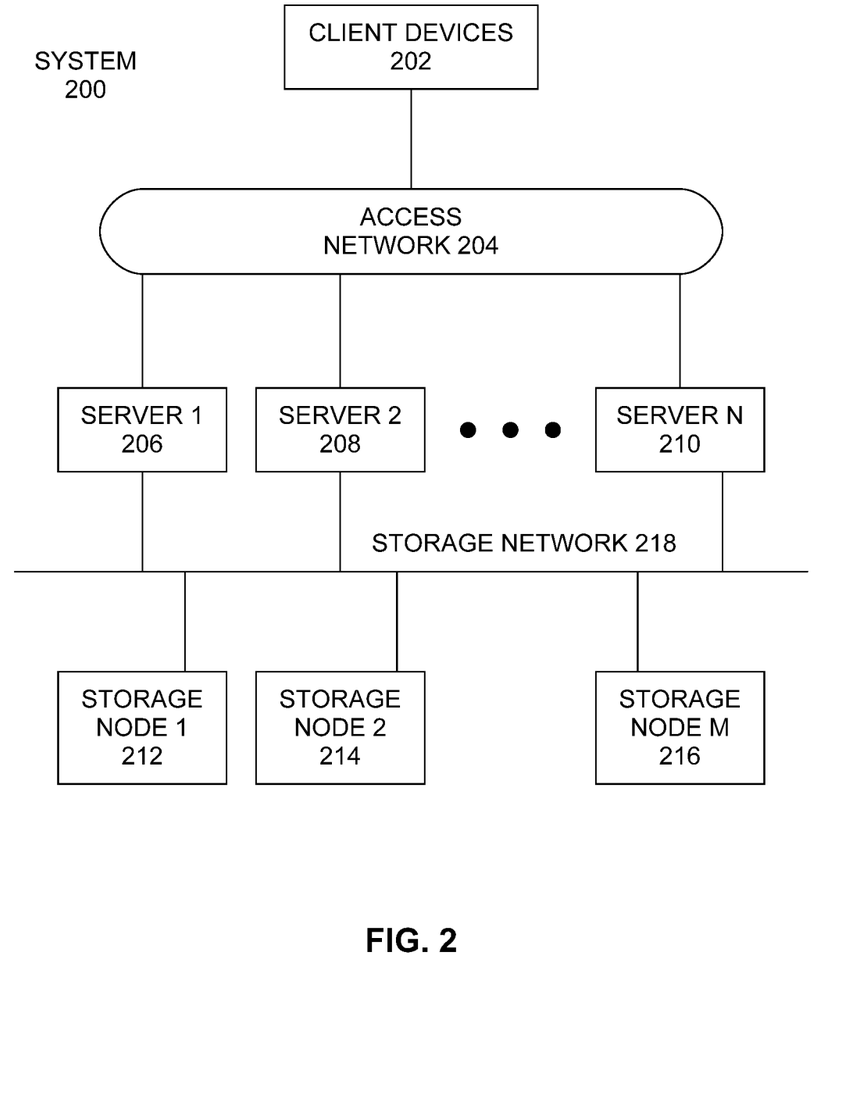
FIG. 2 illustrates an example second system.

FIG. 2 illustrates an example second system 200. In some examples, as shown in FIG. 2, system 200 includes one or more client devices 202 coupled to an access network 204. In at least one embodiment, client devices may comprise any known end user computing platform such as a personal computer (PC), a tablet computer, a mobile phone, and the like, and access network 204 may be the Internet. In at least one embodiment, access network 204 may be an intranet. Client devices 202 may request data over the access network from one or more servers, such as server 1 206, server 2 208, to server N 210. The one or more servers 206, 208, . . . 210 may be coupled to one or more storage nodes, such as storage node 1 212, storage node 2 214, to storage node M 216, over a storage network 218. In one embodiment, a server processes a request by a client device to get data from at least one of the storage nodes or to store data to at least one of the storage nodes. In one embodiment, one or more of storage nodes 212, 214, . . . 216 may be implemented as one or more SSDs and zero or more hard disk drives (HDDs).

Figure 3:
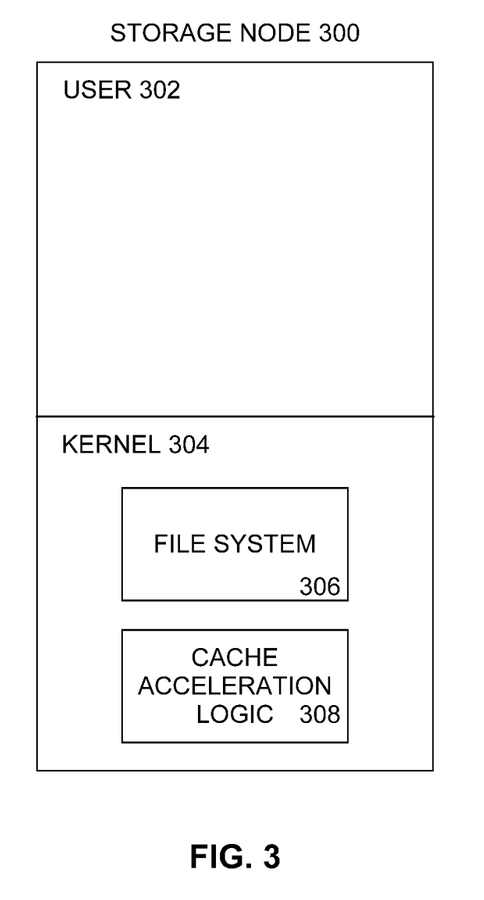
FIG. 3 illustrates an example storage node.

FIG. 3 illustrates an example storage node. Storage node 300 may be an example of at least one of the storage nodes 212, 214, to 216, of FIG. 2. In one embodiment, storage node 300 may be implemented as at least one SSD, coupled with zero or more HDDs. Storage node 300 includes a user section 302 and a kernel section 304. User section 302 may be used to store user data. Kernel section 304 may be used to store file system data 306 (such as metadata for example) used by system 200 to store and retrieve data. Kernel section 304 may also comprise cache acceleration logic 308, which may operate in combination with cache acceleration logic 152 to provide for intelligent caching of data within system 200 according to a cache configuration policy to improve system performance for client device requests.

Figure 4:
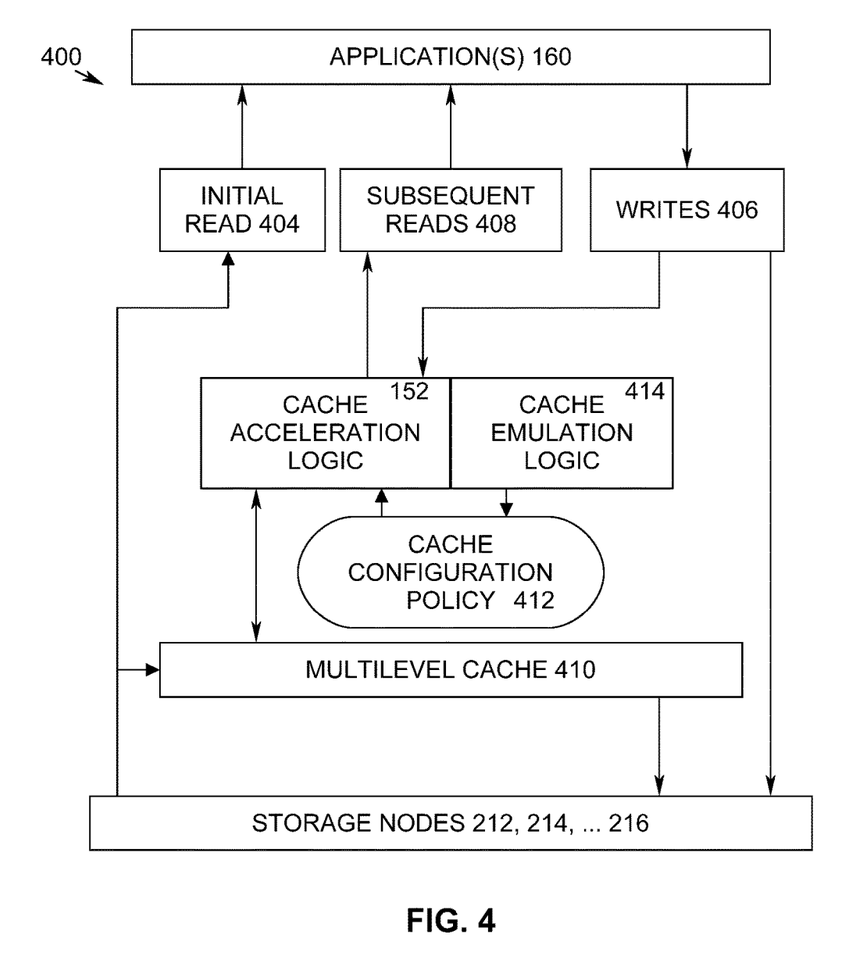
FIG. 4 illustrates an example third system.

FIG. 4 illustrates an example third system. System 400 is a conceptual diagram of application(s) 160 accessing data in storage nodes 212, 214, . . . 216 by using a multilevel cache 410. On initial access, data may be retrieved by application(s) 160 as an initial read 404 from at least one of storage nodes 212, 214, . . . 216, and also stored to multilevel cache 410. Further access may promote the data to system memory 130. In that case, subsequent reads 408 may be returned at high performance RAM or flash memory speed. In an embodiment, data may be written 406 concurrently (write-through) or sequentially (write-back) to multilevel cache 410 and also to one or more storage nodes 212, 214, . . . 216. When multilevel cache 410 is full, newly identified active data evicts stale data from the cache, using cache acceleration logic 152 and cache configuration policy 412. In one embodiment, cache acceleration logic 152 operates at the OS level, transparently accelerating applications with no application or storage configuration required by users. In one embodiment, cache acceleration logic 152 operates in combination with cache emulation logic 414 and cache configuration policy 412 to improve system performance as described below.

In some servers, a type of data accessed by input/output (I/O) operations may be assigned to an I/O class. In some embodiments, the data type may be indicated by file system metadata, file size, file type (such as Moving Pictures Expert Group (MPEG) or Joint Photographic Expert Group (JPEG), for example), or other attributes. In some servers, each I/O class may be assigned its own caching policy. For example, a system administrator may choose to cache the file system journal and not cache large user content files (e.g., video streams).

In general, the presence of I/O classes allows for the specification of an overall cache configuration policy 412 that can distinguish between various I/O classes within a given workload on a server. This allows for fine-grained control of I/O classes allocated to and evicted from multi-level cache 410, but it also creates a large policy configuration space to explore by the system administrator to find an optimal cache configuration policy 412. Even with a relatively small number of I/O classes, there are an exponential number of possible cache configuration policies. For example, when using an eight-bit classifier, there are 256 possible I/O classes (since $2^8$ is 256). Assuming a simple cache/no cache decision for each I/O class, there are $2^{256}$ possible cache configuration policies.

Naively exploring the configuration space of all possible combinations of caching decisions for all I/O classes in a system to search for an optimal cache configuration policy is not feasible. Existing SSD caching solutions are either not based on I/O classification (i.e., the process by which I/O operations are tagged to indicate specific classes of data, such as file system metadata and various file types), or they require that system administrators manually tune the cache for each class of data. In both cases, the resulting caching solutions can be suboptimal, particularly for enterprise and cloud workloads, where there are multiple applications and/or VMs, and a variety of different I/O classes (with different caching needs). In many cases for these systems, cache hit rates are so poor that a caching solution is abandoned.

Instead, methods to predict the cache performance of implementing various cache configuration policies may be desired. Embodiments of the present invention solve the I/O class-based configuration and tuning problem in an automated way to generate an optimal cache configuration policy for a workload.

In an embodiment, an automated cache tuning technique is described that may be based on the use of a "cache utility" metric. An embodiment automatically determines which classes of I/O would benefit the most from being cached in an SSD in a storage node or in any storage system (including a local disk and/or a SSD). In an embodiment, I/O class-based cache emulation logic 414 may be used to make fast "what if" predictions as to the result of implementing possible cache configuration policies. Cache emulation logic 414 may use advanced storage telemetry when simulating the outcomes of possible cache configuration policies. In embodiments, cache acceleration logic 152, cache acceleration logic 308, and cache emulation logic 414 work in combination as a closed feedback loop to automatically determine an optimal cache configuration policy for system 200. The optimal cache configuration policy may then be subsequently used by the computing platform to execute the application. By using the optimal cache configuration policy, performance of the computing platform for processing the application workload may be increased. In an embodiment, cache acceleration logic 152 and cache emulation logic 414 may be integral in the same logical component or circuitry.

Figure 5:
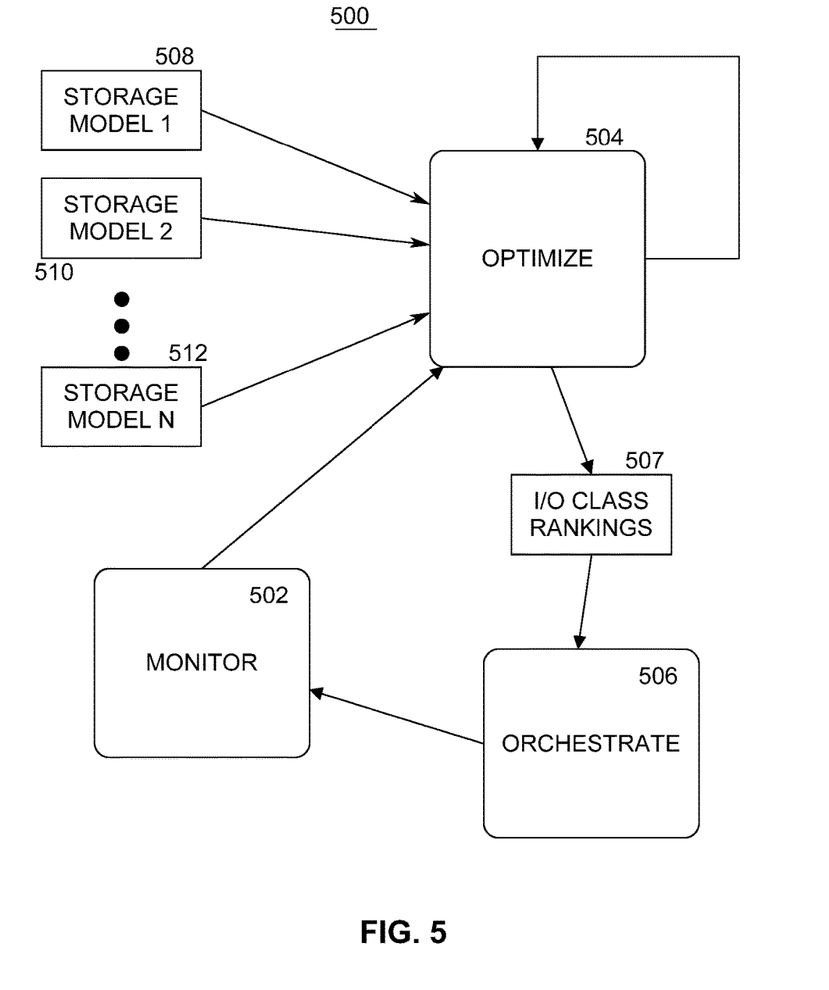
FIG. 5 illustrates an example fourth system.

FIG. 5 illustrates an example fourth system 500. In an embodiment, system 500 uses a feedback loop and I/O class-based cache emulation logic 414 integrated into runtime system 400 to calculate cache utility metrics and automatically configure multilevel cache 410 according to a cache configuration policy 412. In an embodiment, application 160 workloads issue I/O requests. As the handling of the I/O requests proceeds down the software stack within OS 150, monitor function 502 collects I/O traces, thereby logging each issued I/O request and the class of that I/O request. In an embodiment, I/O classes may include metadata and file types. No other existing cache provides such I/O class-based tracing functionality. Trace data may be sent by monitor function 502 to optimize function 504 to automatically analyze at least some of the possible cache configuration policies. Optimize function 504 replays the traces in novel I/O class-based cache emulation logic 414. In an embodiment, optimize function 504 records the size of each I/O class (e.g., sectors consumed on disk) and the I/O class's access pattern (e.g., random v. sequential). This advanced telemetry allows optimize function 504 to determine the working set size and access pattern of each I/O class of data. Optimize function 504 calculates a cache utility metric for each class of I/O, thereby ranking each I/O class 507 as "most useful" to "least useful" in terms of caching to improve overall system performance.

In one embodiment, the cache utility metric may be the number of disk seeks for a given class of I/O, normalized by the working set of that I/O class:

Cache Utility Metric (I/O Class)=Number of disk seeks (I/O Class)/(Number of sectors (I/O Class).

In another embodiment, the cache utility metric may be the number of disk seeks for a given class of I/O, normalized by the number of I/O requests for each class:

Cache Utility Metric (I/O Class)=Number of disk seeks (I/O Class)/(Number of I/O requests (I/O Class).

These cache utility metrics denote how many disk seeks would be saved if that I/O class were to be cached. The higher utility is the better, and I/O classes may thus be ranked by their cache utility. Cache emulation logic 414 records the number of disk seeks of each I/O class, as well as the working set size of each I/O class. In an embodiment, during emulation the working set may be configured with an infinite cache size and a "cache all" policy. At the end of a cache emulation run (i.e., the end of the trace replay in the cache emulation logic), all I/O will be cached. Therefore, the number of cache lines associated with each class of I/O may be determined in order to measure the size of that class, and that size may be divided into the number of disk seeks associated with that class of data to calculate the cache utility metric. In an embodiment, calculating the number of disk seeks for each class of data in a cache emulation model may be accomplished by recording how many disk blocks are "skipped over" relative to the last access to disk for that class of I/O.

The cache utility metric may be used to determine which classes of I/O will benefit the most from caching. I/O classes with higher utility (more disk seeks and fewer accessed blocks, such as small tables for example) represent smaller working set, random I/O that should be cached. In contrast, I/O classes with lower utility (fewer disk seeks and more accessed blocks, such as large index files for example) represent larger working set, sequential I/O that is better served by accessing data from spinning disks (i.e., HDDs).

For example, if there are 20 I/O classes (e.g., I/O class #0 through I/O class #19), the I/O classes may be ranked according to cache utility and assigned their cache eviction priorities accordingly. For example, if class #7 has the lowest cache utility, then data with that I/O class would be the first to be evicted from multilevel cache 410, and if class #15 has the highest cache utility, then data with that I/O class would be the last to be evicted from the cache.

Cache emulation models may be stored as storage model 1 508, storage model 2 510, . . . storage model N 512, as determined by one or more iterations of processing by Optimize 504.

Thus the novel I/O class-based cache utility metric may be used to automatically tune the efficient operation of the cache. As a result of emulating cache operations based on the traces, optimize function 504 reports I/O class rankings 507 to orchestrate function 506. Orchestrate function 506 communicates the I/O class rankings 507 to cache acceleration logic 152 and cache acceleration logic 308 to set the optimal cache configuration policy for the current workload based at least in part on the I/O class rankings.

Figure 6:
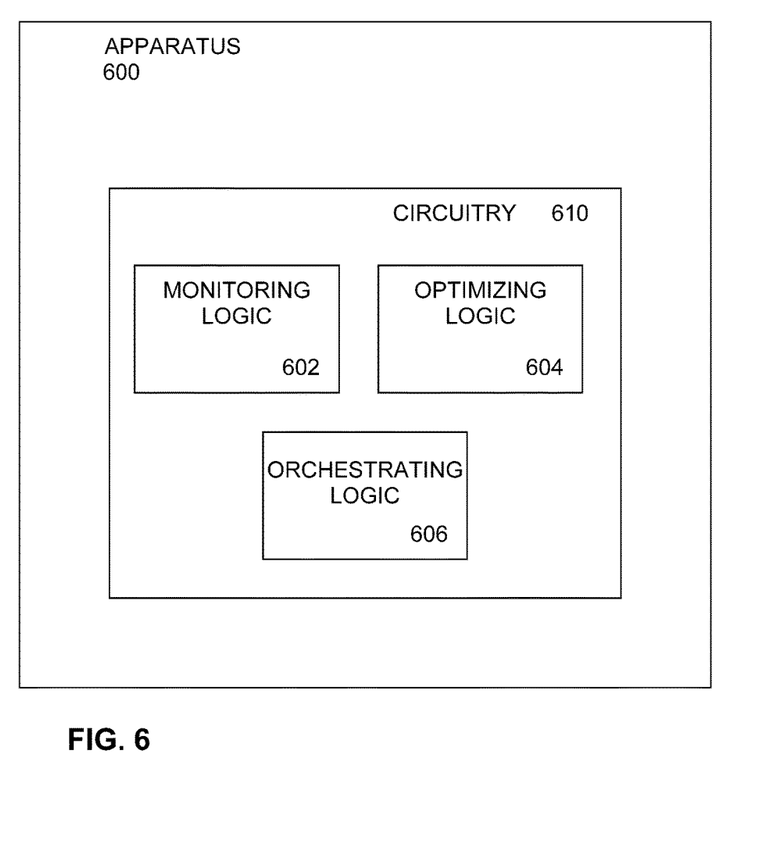
FIG. 6 illustrates an example block diagram for an apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be associated with logic and/or features of processing logic (e.g., cache emulation logic 414 and/or cache acceleration logic 152 as shown in FIG. 4) hosted by a computing platform 101 and may be supported by circuitry 610. For these examples, circuitry 610 may be incorporated within circuitry, processor circuitry, a processing element, a CPU or a core maintained at the computing platform 101. Circuitry 610 may be arranged to execute one or more software, firmware or hardware implemented modules, components or logic 602, 604, and 606. Module, component or logic may be used interchangeably in this context. The examples presented are not limited in this context and the different variables used throughout may represent the same or different integer values. Also, "logic", "module" or "component" may also include software/firmware stored in computer-readable media, and although the types of logic are shown in FIG. 6 as discrete boxes, this does not limit these components to storage in distinct computer-readable media components (e.g., a separate memory, etc.).

According to some examples, circuitry 610 may include a processor, processor circuit, processor circuitry, processor element, core or CPU. Circuitry 610 may be generally arranged to execute or implement one or more modules, components or logic 602, 604, 606. Circuitry 610 may be all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; or similar processors. According to some examples, circuitry 610 may also include an application specific integrated circuit (ASIC) and at least some logic 602, 604, 606 may be implemented as hardware elements of the ASIC. According to some examples, circuitry 610 may also include a field programmable gate array (FPGA) and at least some logic 602, 604, 606 may be implemented as hardware elements of the FPGA.

According to some examples, apparatus 600 may include monitoring logic 602. Monitoring logic 602 may be executed or implemented by circuitry 610 to perform processing as described with reference to monitor function 502 of FIG. 5. In some examples, apparatus 600 may include optimizing logic 604. Optimizing logic 604 may be executed or implemented by circuitry 610 to perform processing as described with reference to optimize function 504 of FIG. 5. According to some examples, apparatus 600 may include orchestrating logic 606. Orchestrating logic 606 may be executed or implemented by circuitry 610 to perform processing as described with reference to orchestrate function 506 of FIG. 5

Various components of apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 7:
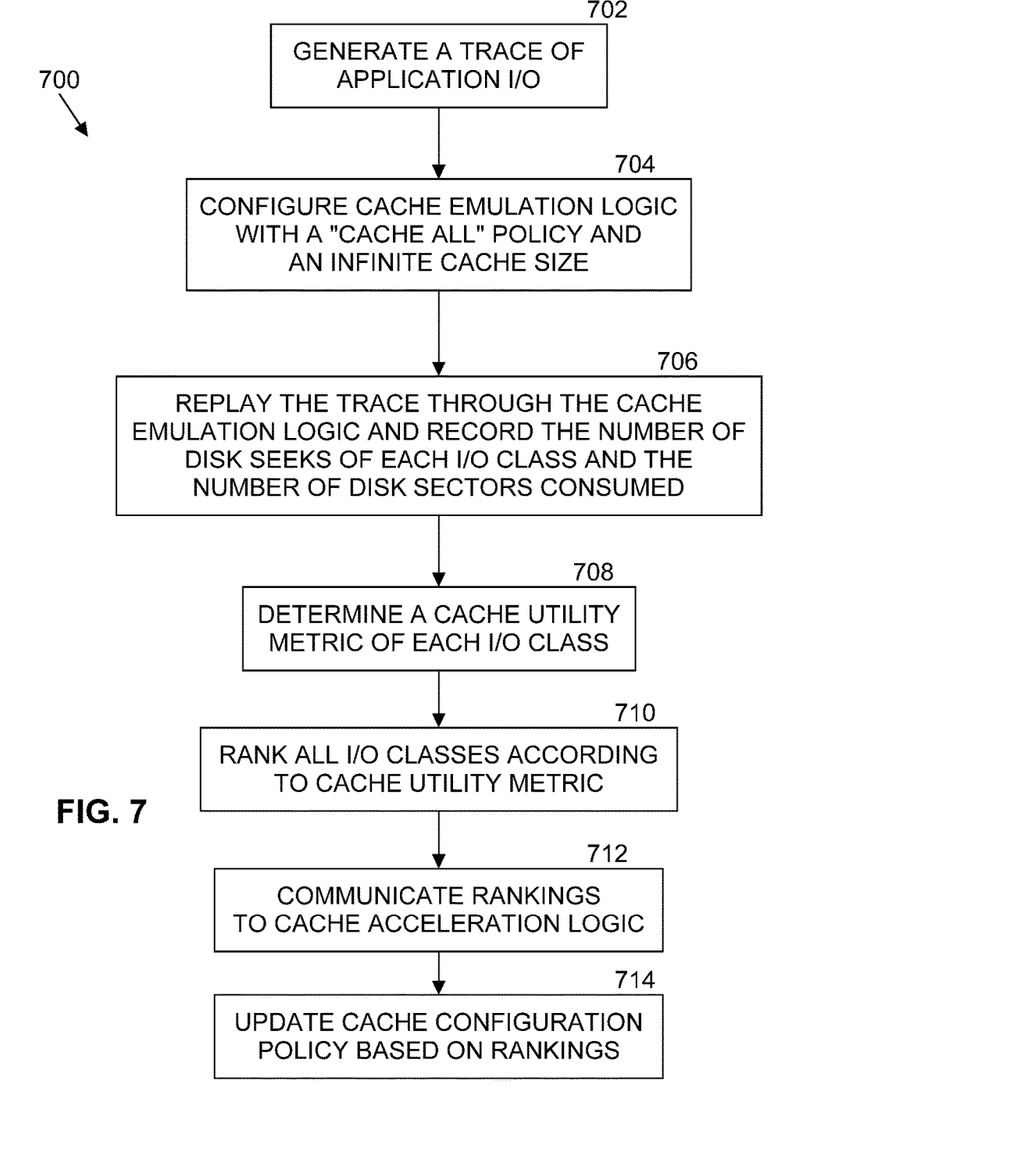
FIG. 7 illustrates an example of a logic flow.

FIG. 7 illustrates an example of a second logic flow. Logic flow 700 may be representative of some or all of the operations executed by one or more logic, features, or devices described herein, such as apparatus 600. More particularly, logic flow 700 may be implemented by at least monitoring logic 602, optimizing logic 604, and/or orchestrating logic 606.

According to some examples, at block 702 an application 160 may be run on computing platform 101 and monitoring logic 602 generates a trace of the application's I/O operations. The trace includes the I/O class of each I/O operation. At block 704, optimizing logic 604 configures cache emulation logic 414 with a "cache all" policy using an infinite cache size. This results in caching every I/O class of data and no data will be evicted from the cache. Next, at block 706 optimizing logic 704 replays the trace through cache emulation logic 414 and, in one embodiment, records the number of disk seeks of each I/O class and the number of disk sectors consumed by each I/O class. At block 708, optimizing logic 604 determines a cache utility metric value of each I/O class based on this trace. At block 710, optimizing logic 604 ranks all I/O classes according to the cache utility metric values. In an embodiment, the ranking is from highest cache utility value to lowest cache utility value. The ranking represents the allocation and eviction priority of each class of I/O. At block 712, orchestration logic 606 communicates the rankings to cache acceleration logic 152 and cache acceleration logic 308. In an embodiment, the optimal cache configuration policy reflects the I/O class ranking. At block 714, cache acceleration logic 152 and cache acceleration logic 308 update the cache configuration policy used to manage multilevel cache 410. In an embodiment, monitoring of the workload may continue. When the workload changes, blocks 702 through 712 may be repeated.

In an embodiment, instead of using SSDs to cache data from HDDs, a cache utility metric may also be applied when using non-volatile memory and/or Negative-AND (NAND) memory. In some systems, storage devices such as 3D XPoint (e.g., Optane™ storage devices commercially available from Intel Corporation) may be used. 3D XPoint memory provides a vastly improved Quality of Service (QoS) that also has low tail latency (where as NAND SSDs exhibit decreased performance due to tail latency). In future storage devices, larger die capacity may increase the problem. Accordingly, in an embodiment, a cache utility metric may be defined that uses a QoS violation (e.g., latency higher than a defined value) as a "seek":

Cache Utility Metric (I/O Class)=QoS Violations (I/O Class)/Number of Sectors (I/O Class.

In another embodiment, the cache utility metric may be defined as:

Cache Utility Metric (I/O Class)=QoS Violations (I/O Class)/Number of I/Os (I/O Class).

Considering that 3D XPoint storage devices may be useful as a cache for open-channel SSD devices, writes and erases are expensive blocking operations that may also be substituted for "seeks" in the cache utility metric calculation. In an embodiment, the cache utility metric may be defined as:

Cache Utility Metric (I/O Class)=Number of Blocking Operations (I/O Class)/Number of Sectors (I/O Class).

In another embodiment, the cache utility metric may be defined as:

Cache Utility Metric (I/O Class)=Number of Blocking Operations (I/O Class)/Number of Operations (I/O Class).

Figure 8:
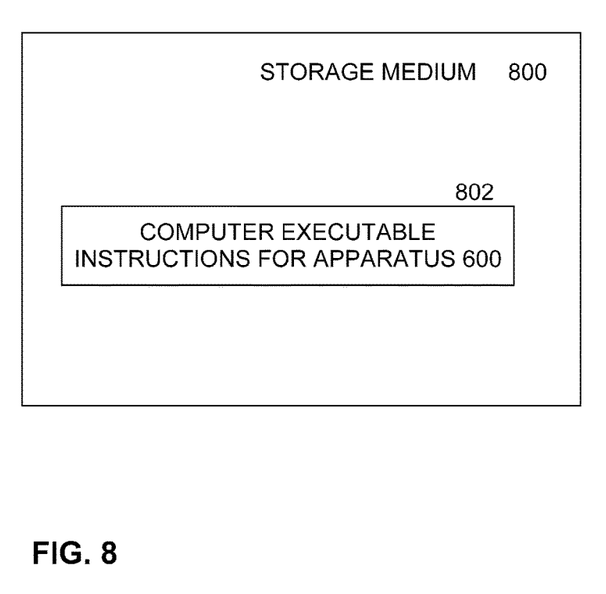
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions 802 for apparatus 600 to implement logic flow 700. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
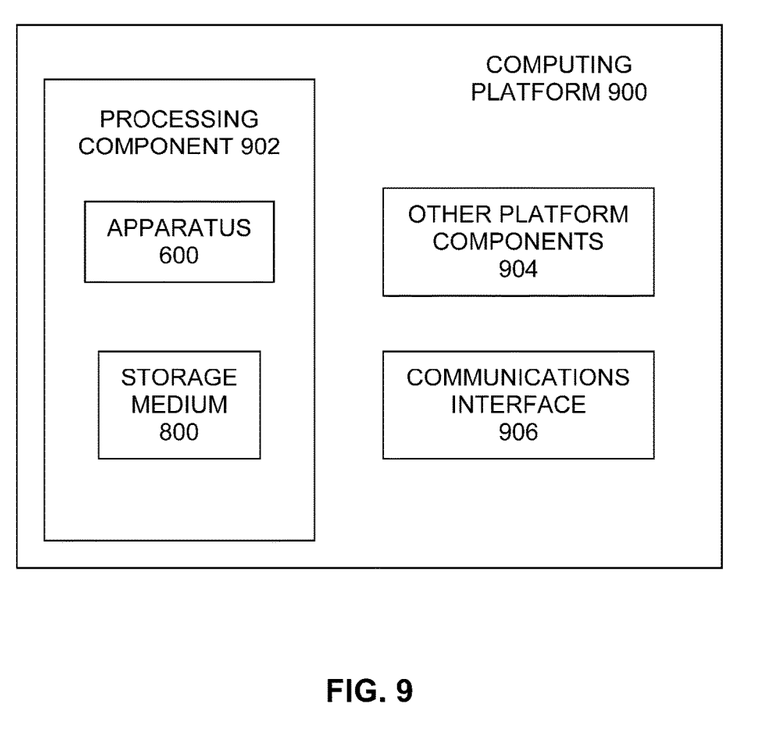
FIG. 9 illustrates an example computing platform.

FIG. 9 illustrates an example computing platform 900. In some examples, as shown in FIG. 9, computing platform 900 may include a processing component 902, other platform components 904 and/or a communications interface 906. According to some examples, computing platform 900 may be implemented in a server, such as server 206, 208, ... 210. The server may be capable of coupling through a network to other servers and may be part of a datacenter including a plurality of network connected servers arranged to host one or more VMs.

According to some examples, processing component 902 may execute processing operations or logic for apparatus 600 and/or storage medium 800. Processing component 902 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 904 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 906 may include logic and/or features to support a communication interface. For these examples, communications interface 906 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

As mentioned above computing platform 900 may be implemented in a server of a datacenter. Accordingly, functions and/or specific configurations of computing platform 900 described herein, may be included or omitted in various embodiments of computing platform 1000, as suitably desired for a server deployed in a datacenter.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include circuitry for a computing platform. The apparatus may also include logic for execution by the circuitry. The logic may monitor processing of I/O requests of an application being executed by a computing platform by collecting a trace of the I/O requests, the trace including an I/O class of each I/O request, replay the trace and automatically analyze possible cache configuration policies for using a cache during execution of the application by the computing platform, and determine an optimal cache configuration policy for the cache from the possible cache configuration policies.

EXAMPLE 2

The apparatus of example 1, the logic may also apply the optimal cache configuration policy to use of the cache during subsequent execution of the application by the computing platform.

EXAMPLE 3

The apparatus of example 1, the logic may also determine a cache utility metric for each I/O class.

EXAMPLE 4

The apparatus of example 3, the logic may also rank I/O classes according to the cache utility metric from most useful to least useful for improving performance of the computing platform while executing the application.

EXAMPLE 5

The apparatus of example 4, the logic may also determine the optimal cache configuration policy based on the I/O class rankings.

EXAMPLE 6

The apparatus of example 3, wherein the cache utility metric comprises a number of disk seeks for an I/O class divided by a number of sectors accessed by the I/O class.

EXAMPLE 7

The apparatus of example 3, wherein the cache utility metric comprises a number of disk seeks for an I/O class divided by a number of I/O requests for the I/O class.

EXAMPLE 8

The apparatus of example 7, the logic may also apply a "cache all" policy and an infinite cache size when replaying the trace and automatically analyze possible cache configuration policies for using a cache.

EXAMPLE 9

The apparatus of example 1, the logic may also perform the monitoring, replaying, and determining when a workload of the application changes.

EXAMPLE 10

An example method may include monitoring processing of I/O requests of an application being executed by a computing platform by collecting a trace of the I/O requests, the trace including an I/O class of each I/O request; replaying the trace and automatically analyzing possible cache configuration policies for using a cache during execution of the application by the computing platform; and determining an optimal cache configuration policy for the cache from the possible cache configuration policies.

EXAMPLE 11

The method of example 10 may also applying the optimal cache configuration policy to use of the cache during subsequent execution of the application by the computing platform.

EXAMPLE 12

The method of example 10 may also include determining a cache utility metric for each I/O class.

EXAMPLE 13

The method of example 12 may also include ranking I/O classes according to the cache utility metric from most useful to least useful for improving performance of the computing platform while executing the application.

EXAMPLE 14

The method of example 13 may also include determining the optimal cache configuration policy based on the I/O class rankings.

EXAMPLE 15

The method of example 12, wherein the cache utility metric comprises a number of disk seeks for an I/O class divided by a number of sectors accessed by the I/O class.

EXAMPLE 16

The method of example 12, wherein the cache utility metric comprises a number of disk seeks for an I/O class divided by a number of I/O requests for the I/O class.

EXAMPLE 17

The method of example 14 may also include applying a "cache all" policy and an infinite cache size when replaying the trace and automatically analyze possible cache configuration policies for using a cache.

EXAMPLE 18

The method of example 10 may also include performing the monitoring, replaying, and determining when a workload of the application changes.

EXAMPLE 19

An example apparatus may include means for performing the methods of any one of examples 10 to 18.

EXAMPLE 20

An example at least one machine readable medium may include a plurality of instructions that in response to being executed by a system at a computing platform may cause the system to monitor processing of I/O requests of an application being executed by a computing platform by collecting a trace of the I/O requests, the trace including an I/O class of each I/O request, replay the trace and automatically analyze possible cache configuration policies for using a cache during execution of the application by the computing platform, and determine an optimal cache configuration policy for the cache from the possible cache configuration policies.

EXAMPLE 21

The at least one machine readable medium of example 20, the instructions may further cause the system to apply the optimal cache configuration policy to use of the cache during subsequent execution of the application by the computing platform.

EXAMPLE 22

The at least one machine readable medium of example 20, the instructions may further cause the system to determine a cache utility metric for each I/O class.

EXAMPLE 23

The at least one machine readable medium of example 22, the instructions may further cause the system to adjust rank I/O classes according to the cache utility metric from most useful to least useful for improving performance of the computing platform while executing the application.

EXAMPLE 24

The at least one machine readable medium of example 23, the instructions may further cause the system to determine the optimal cache configuration policy based on the I/O class rankings.

EXAMPLE 25

The at least one machine readable medium of example 22, wherein the cache utility metric comprises a number of disk seeks for an I/O class divided by a number of sectors accessed by the I/O class.

EXAMPLE 26

The at least one machine readable medium of example 22, wherein the cache utility metric comprises a number of disk seeks for an I/O class divided by a number of I/O requests for the I/O class.

EXAMPLE 27

The at least one machine readable medium of example 24, the instructions may further cause the system to apply a "cache all" policy and an infinite cache size when replaying the trace and automatically analyze possible cache configuration policies for using a cache.

EXAMPLE 28

The at least one machine readable medium of example 20, the instructions may further cause the system to perform the monitoring, replaying, and determining when a workload of the application changes.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry; and
   logic for execution by the circuitry to:
   monitor processing of Input/Output (I/O) requests of an application being executed by a computing platform by collecting a trace of the I/O requests, the trace including an I/O class of each I/O request,
   replay the trace and automatically analyze possible cache configuration policies for using a cache during execution of the application by the computing platform,
   determine a cache utility metric for each I/O class;
   rank I/O classes according to the cache utility metrics from most useful to least useful for improving performance of the computing platform while executing the application; and
   determine an optimal cache configuration policy for the cache from the possible cache configuration policies.

2. The apparatus of claim 1, comprising the logic to:
   apply the optimal cache configuration policy to use of the cache during subsequent execution of the application by the computing platform.

3. The apparatus of claim 1, comprising the logic to:
   determine the optimal cache configuration policy based on the I/O class rankings.

4. The apparatus of claim 3, comprising the logic to:
   apply a "cache all" policy and an infinite cache size when replaying the trace and automatically analyze possible cache configuration policies for using the cache.

5. The apparatus of claim 1, wherein the cache utility metric comprises a number of disk seeks for a first I/O class divided by a number of sectors accessed by the I/O first class.

6. The apparatus of claim 1, wherein the cache utility metric comprises a number of disk seeks for a second I/O class divided by a number of I/O requests for the I/O second class.

7. The apparatus of claim 1, comprising the logic to:
   perform the monitoring, replaying, and determining when a workload of the application changes.

8. A method comprising:
   monitoring processing of I/O requests of an application being executed by a computing platform by collecting a trace of the I/O requests, the trace including an I/O class of each I/O request;
   replaying the trace and automatically analyzing possible cache configuration policies for using a cache during execution of the application by the computing platform;
   determining a cache utility metric for each I/O class;
   ranking I/O classes according to the cache utility metrics from most useful to least useful for improving performance of the computing platform while executing the application; and
   determining an optimal cache configuration policy for the cache from the possible cache configuration policies.

9. The method of claim 8, comprising:
   applying the optimal cache configuration policy to use of the cache during subsequent execution of the application by the computing platform.

10. The method of claim 8, comprising:
    determining the optimal cache configuration policy based on the I/O class rankings.

11. The method of claim 10, comprising:
    applying a "cache all" policy and an infinite cache size when replaying the trace and automatically analyze possible cache configuration policies for using the cache.

12. The method of claim 8, wherein the cache utility metric comprises a number of disk seeks for a first I/O class divided by a number of sectors accessed by the first I/O class.

13. The method of claim 8, wherein the cache utility metric comprises a number of disk seeks for a second I/O class divided by a number of I/O requests for the I/O second class.

14. The method of claim 8, comprising:
    performing the monitoring, replaying, and determining when a workload of the application changes.

15. At least one non-transitory machine readable medium comprising a plurality of instructions that in response to being executed by a system at a computing platform cause the system to:
    monitor processing of I/O requests of an application being executed by a computing platform by collecting a trace of the I/O requests, the trace including an I/O class of each I/O request,
    replay the trace and automatically analyze possible cache configuration policies for using a cache during execution of the application by the computing platform,
    determine a cache utility metric for each I/O class;
    rank I/O classes according to the cache utility metrics from most useful to least useful for improving performance of the computing platform while executing the application; and
    determine an optimal cache configuration policy for the cache from the possible cache configuration policies.

16. The at least one non-transitory machine readable medium of claim 15, comprising the instructions to further cause the system to:
    apply the optimal cache configuration policy to use of the cache during subsequent execution of the application by the computing platform.

17. The at least one non-transitory machine readable medium of claim 15, comprising the insertions to further cause the system to:
    determine the optimal cache configuration policy based on the I/O class rankings.

18. The at least one non-transitory machine readable medium of claim 17, comprising the insertions to further cause the system to:
   apply a "cache all" policy and an infinite cache size when replaying the trace and automatically analyze possible cache configuration policies for using the cache.

19. The at least one non-transitory machine readable medium of claim 15, wherein the cache utility metric comprises a number of disk seeks for a first I/O class divided by a number of sectors accessed by the first I/O class.

20. The at least one non-transitory machine readable medium of claim 15, wherein the cache utility metric comprises a number of disk seeks for a second I/O class divided by a number of I/O requests for the second I/O class.

21. The at least one non-transitory machine readable medium of claim 15, comprising the insertions to further cause the system to:
   perform the monitoring, replaying, and determining when a workload of the application changes.

* * * * *